Feb. 2, 1926.

G. G. CHAMBERLAIN 1,571,752

AUTOMATIC DRIP COFFEEPOT

Filed Oct. 8, 1925 2 Sheets-Sheet 1

Inventor
G. G. Chamberlain
by Wilkinson & Giusta
Attorneys.

Feb. 2, 1926.
G. G. CHAMBERLAIN
1,571,752
AUTOMATIC DRIP COFFEEPOT
Filed Oct. 8, 1925  2 Sheets-Sheet 2
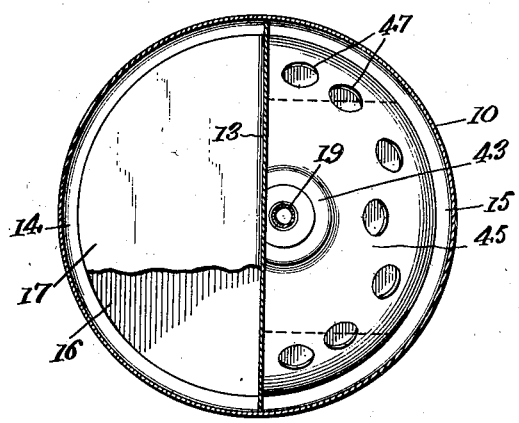
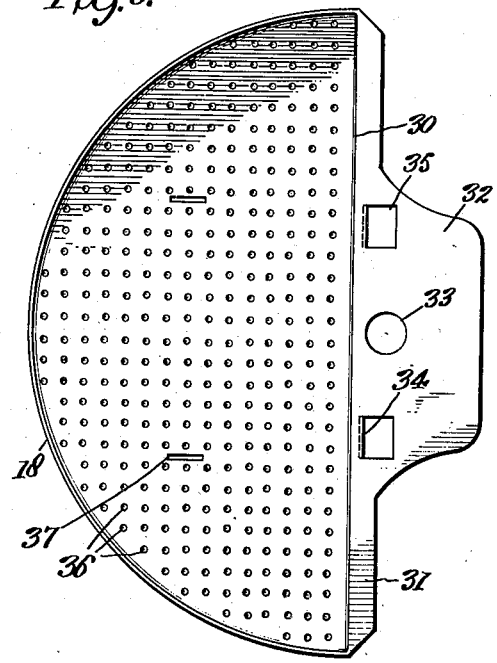
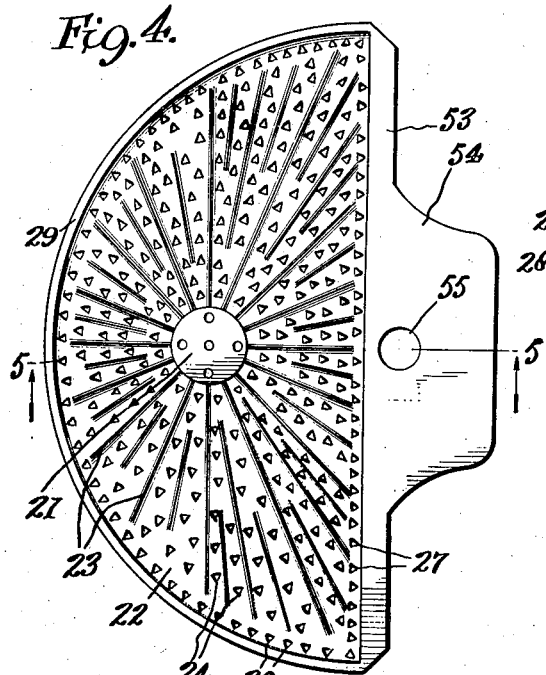
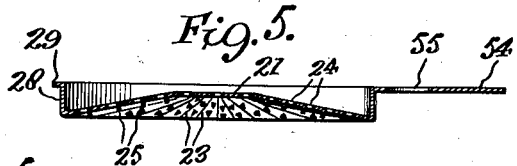
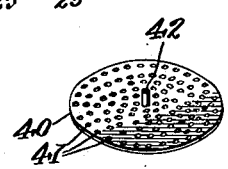
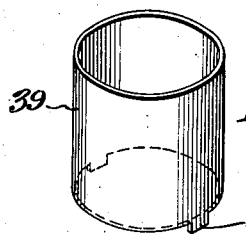
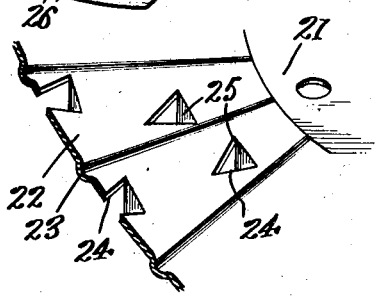
Inventor
G. G. Chamberlain
by Wilkinson & Giusta
Attorneys.

Patented Feb. 2, 1926.

1,571,752

UNITED STATES PATENT OFFICE.

GRACE GERMAN CHAMBERLAIN, OF NEW ORLEANS, LOUISIANA, ASSIGNOR OF ONE-FIFTH TO WALTER W. FIFE, OF NEW ORLEANS, LOUISIANA.

AUTOMATIC DRIP COFFEEPOT.

Application filed October 8, 1925. Serial No. 61,285.

*To all whom it may concern:*

Be it known that I, GRACE GERMAN CHAMBERLAIN, a citizen of the United States, residing at New Orleans, in the parish of Orleans and State of Louisiana, have invented certain new and useful Improvements in Automatic Drip Coffeepots; and I do hereby declare the following to be a full, clear, and exact description of the invention, such as will enable others skilled in the art to which it appertains to make and use the same.

The present invention relates to improvements in automatic drip coffee pot and consists in certain improvements over U. S. Patent No. 1,174,683, granted March 7, 1916.

An advantage of the invention lies in an improved construction of generator at the base of the pot for inducing an active and forceful flow of the boiling water to an improved distributing plate above the coffee grounds receptacle.

A further object of the invention resides in providing, in conjunction with the normal receptacle for the coffee grounds, a detachable thimble for holding a lesser quantity of the grounds whereby small quantities of coffee may be made quickly and without waste.

With the foregoing and other objects in view, the invention will be more fully described hereinafter and will be more particularly pointed out in the claims appended hereto.

In the drawings, wherein like symbols refer to like or corresponding parts throughout the several views, Figure 1 is a vertical section taken through an improved coffee pot constructed according to the present invention.

Figure 3 is a horizontal section taken on the line 3—3 in Figure 1.

Figure 4 is an enlarged top plan view of the spreader plate above the coffee grounds receptacle.

Figure 5 is a cross sectional view taken on the line 5—5 in Figure 4.

Figure 6 is a top plan view of the coffee grounds receptacle with the spreader plate removed.

Figure 7 is an enlarged fragmentary perspective view of a portion of this cover.

Figure 8 is a perspective view of the thimble, and

Figure 9 is a similar view of a spreader plate used with this thimble.

Figure 1:
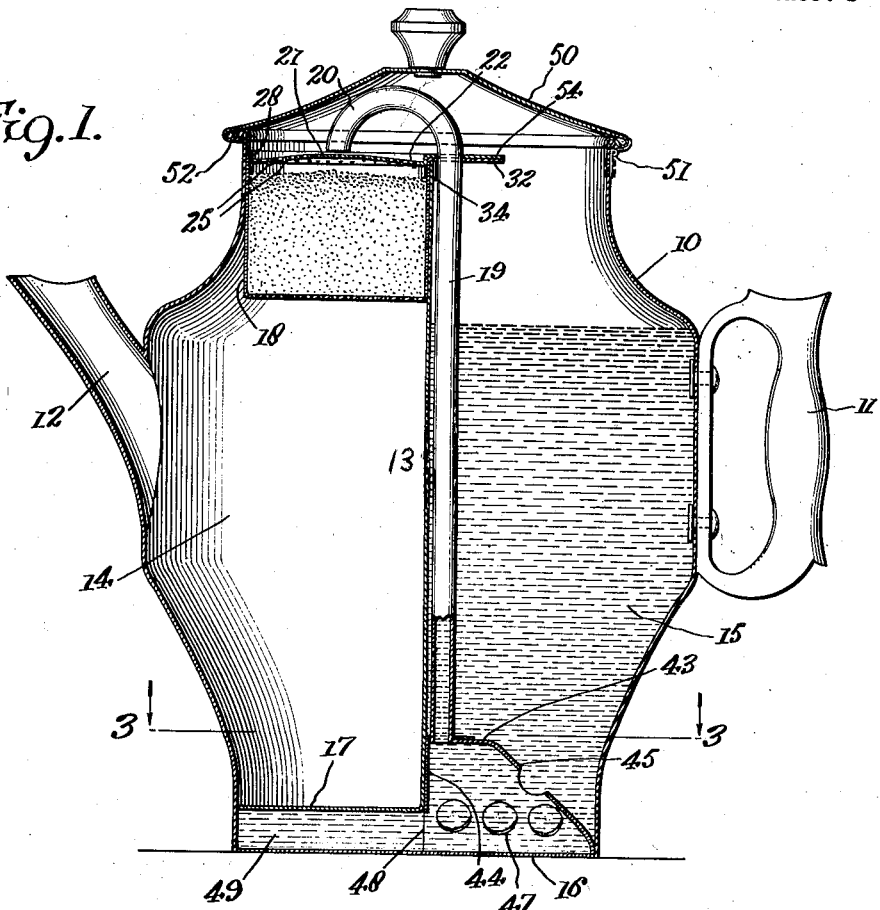
Figure 2:
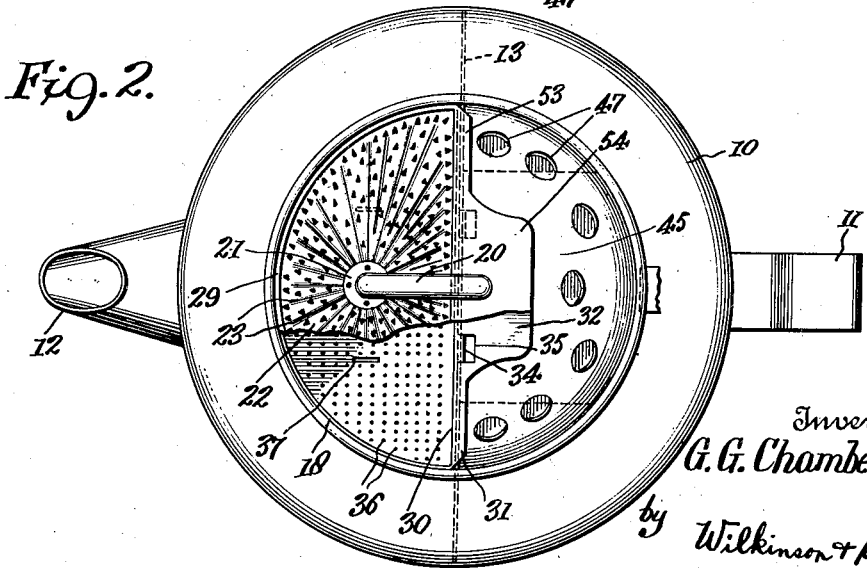
Figure 2 is a top plan view with the cover removed and parts broken away.

Referring more particularly to the drawings, 10 designates generally a coffee pot having the handle 11 at one side and the pouring spout 12 at the opposite side and divided interiorly by the partition 13, which extends vertically and separates the coffee compartment 14 from the water compartment 15; it being understood that the coffee compartment 14 is in communication with the spout 12, and that the partition 13 cuts off all communication between the water compartment and such spout, whereby on tilting the coffee pot the coffee will be poured from the spout.

The partition plate 13, of course, extends completely across the container body 10 and it terminates at its lower end short of the bottom 16 of the coffee pot. At its lower end the partition is bent laterally or angularly to provide the false bottom 17, whereby to hold the coffee in the compartment 14 and prevent access of water from the compartment below to the coffee compartment.

The entire bottom 16 must contain water thereabove in order to prevent burning of the bottom and also to provide a generator for furnishing boiling water to the receptacle 18 for holding the coffee grounds, which receptacle is provided with a perforated bottom and is situated above the coffee compartment 14.

A pipe 19 extends upwardly along side the partition 13 in the water compartment 15 for lifting this boiling water to the coffee grounds receptacle, the upper end of the pipe having the elbow portion 20 with down-turned mouth above the central part of the receptacle 18.

This down-turned mouth is adapted to discharge the boiling water onto a central disc 21 made at a high point on the spreader plate 22, shown more particularly in Figures 4 and 5. Grooves 23 radiate outwardly and downwardly from the disc 21 and are adapted to convey the boiling water uniformly to the drip openings 24. These openings are preferably made adjoining the grooves whereby the boiling water may overflow up the sides of the grooves and be evenly distributed to the drip openings 24 from which the water will percolate down through the coffee grounds in the receptacle 18 below. As shown in Figure 7, the drip openings 24 are made by punching portions of the metallic drip plate and bending these cut out portions 24 downwardly. The water may drip off these downward projections and may be distributed by dropping upon the coffee grounds. A positive and equal drip of boiling water is thus secured for the grounds.

The water will gravitate down the inclined grooves 23 and an arcuate series of drip openings 26 is also made at the lower edge of the spreader plate to catch the water which issues from the ends of the grooves 23.

A series of such openings 27 are also provided in a straight line subtending the arc of the drip openings 26. The line of openings 27 is also at a low point and a flange 28, best shown in Figure 5, extends upwardly from the drip plate to catch any excess water and also to form a support for the spreader plate upon the upper rim of the coffee receptacle 18. For this reason the flange 28 is provided with an out-turned annular shoulder 29, shown in Figure 1, as resting on the rim of the receptacle 18. The depth of the flange 28 regulates the slope of the spreaded plate 22. The bottom of the coffee receptacle 18 is finely perforated to permit the coffee to drop through into the receptacle 14 beneath.

The coffee receptacle 18 itself is also shown more particularly in Figure 6 as having an arcuate outer wall to conform generally to the external curvature of the coffee pot at this point and it is provided with the straight inner wall 30 connecting the ends of the outer curved wall and this straight wall is adapted to lie against the upper portion of the partition 13. At the upper end of the inner wall 30 is provided the supporting flange 31 extending above the upper edge of the partition 13. At the intermediate part of the flange 31 is a laterally enlarged portion 32 having a central perforation 33 to receive the spout 19 and to form a support for the spout. Tongues 34 are cut out from openings 35 in the portion 32 and bent downwardly in position to clinch against the opposite side of the partition 13, whereby to hold the coffee receptacle securely in place.

The spreader plate 22 is also provided with a flange 53 similar to the flange 31 on the coffee receptacle, the flange 53 adapted to rest upon the flange 31. A laterally offset portion 54 is also provided upon the flange 53 for resting upon the laterally offset part 32 of the flange 31, and a perforation 55 is made in the flange 53 and its laterally offset part in registry with the perforation 33 in the parts 31 and 32. These registering perforations receive the coffee spout as heretofore explained.

The bottom of the coffee receptacle is provided with the minute perforations 36 and with spaced slots 37 to receive the tabs or projections 38 extending downwardly from the thimble 39 shown in Figure 8. This thimble, when placed in the coffee receptacle with the projections thereof 38 registering and fitting in the slots 37 of the perforated bottom of the coffee receptacle, is adapted to form a receptacle of restricted size for making a smaller quantity of coffee, for instance two or three cups of the coffee, but it insures perfect extraction of coffee values when making small quantities of coffee.

In Figure 9 is shown a spreader plate 40 for use in connection with the thimble, the spreader plate being a round disc to agree with the cylindrical character of the thimble 39. The perforations in the plate are indicated at 41 to permit the boiling water to drip down upon the grounds held in the thimble. A projection or handle 43 is provided upon the plate 40 for the purpose of placing it and lifting it out of the thimble.

The generator is shown at the base of the spout 19. The top wall 43 of this generator is offset from the vertical center of the generator toward the partition 13 in order that the highest part of the generator may communicate with the lower end of the spout 19. The generator is made also with the vertical straight wall 44 lying against the partition 13 and with the rounded diagonal wall 45 sloping down from one edge of the top wall 43 and curving to the bottom of the generator. The curved diagonal wall 45 is provided with the perforations 47 to permit of free flow of the water from the compartment 15 in to the generator. The interior of the generator also communicates through an opening 48 with the space 49 below the false bottom 17. The upper portion of the wall 45 is left imperforate in order to guide the heated water upwardly to the spout 19. The spout 19 is preferably crimped in the top wall 43 of the generator and aluminum reinforcement is preferably placed at this point to add to the strength of the spout.

The lid of the coffee pot is shown at 50, being hinged at 51 and provided with the bead 52 adapted to lap over the upper edge of the pot and form a tight joint.

In the use of the device the water is poured into the water compartment 15 and coffee grounds placed in the receptacle 18 or in the thimble 39, according to the quantity of the coffee to be made. Either the spreader plate 40 shown in Figure 9 or the spreader plate 22 shown in Figure 4 is then mounted in place and the coffee pot placed upon the stove. As soon as the water begins to boil it will rise in the upper portion of the generator and in the spout 19 and will overflow upon the spreader plate and be guided by the grooves and drip openings over the entire area of the coffee grounds, the water dripping evenly from the drip openings upon the coffee grounds, percolating therethrough and issuing through the perforated bottom of the receptacle 18 into the coffee compartment 14. In this manner a complete extraction of all of the coffee values is secured and waste is avoided while securing a superior beverage.

It is obvious that various changes and modifications may be made in the details of construction and design of the above specifically described embodiment of this invention without departing from the spirit thereof, such changes and modifications being restricted only by the scope of the following claims:—

What is claimed is:—

1. A coffee pot comprising a pot body, a partition for dividing the same into water and coffee compartments, said partition having a false bottom extending thereof in the coffee compartment, a generator at the base of the water compartment having a flat wall fitting against the lower part of the partition, a top wall adjoining the partition and a curved diagonal wall sloping toward the bottom of the coffee pot and having perforations therein to admit the water to the generator, a spout rising from the top wall of the generator close to the partition and having a discharge end disposed above the coffee compartment, a receptacle for the coffee grounds held by said partition above the coffee compartment, and means for distributing the boiling water received from said spout evenly to the coffee grounds in said receptacle.

2. A coffee pot comprising a pot body, a partition dividing the body into water and coffee compartments, a coffee grounds receptacle having a flat wall lying against the upper portion of the partition and provided with a flange extending over the upper edge of the partition with tongues clinched upon the opposite side of the partition, a spreader plate resting upon the upper edge of said receptacle having a flange fitting upon the flange of the receptacle, both said flanges having lateral extensions, said flanges and lateral extensions thereof having registering perforations, a spout received through said registering perforations and having a discharge end disposed above said spreader plate, and a generator in the water compartment communicating with the base of the spout.

3. A coffee pot comprising a pot body, a partition therein dividing the same into water and coffee compartments, a coffee receptacle above the coffee compartment, a spout connecting with the lower portion of the water compartment and having a discharge end above said coffee receptacle, and a spreader plate on the coffee receptacle having a high central portion disposed beneath said spout with grooves radiating therefrom and drip openings adjoining said grooves.

4. A coffee pot comprising a pot body, a partition therein dividing the body into water and coffee compartments, a coffee grounds receptacle above the coffee compartment, a spout connecting with the water compartment and having a discharge end above the coffee grounds receptacle, and a spreader plate above the coffee grounds receptacle having a flat high central portion beneath the spout with outwardly and downwardly sloping portions from the flat part, said sloping portions having grooves radiating from the flat portion and having openings adjoining the grooves with projections extending down from the openings for causing the boiling water to issue drop by drop on the coffee grounds in the coffee receptacle.

5. A coffee pot comprising a pot body, a partition dividing the body into water and coffee compartments, a coffee grounds receptacle above the coffee compartment, a spout communicating with the water compartment and having a discharge opening above the coffee grounds receptacle, and a spreader plate on the receptacle comprising a sloping plate body having grooves and drip openings therein with an upturned flange at the outer edge portions of the spreader plate and a shoulder extending outwardly of the flange for resting upon the rim of the receptacle.

6. A coffee pot comprising a pot body, a partition dividing the same into water and coffee compartments, a coffee grounds receptacle held above said coffee compartment, a spout connecting with said water compartment and with the space above the grounds receptacle, a thimble of smaller size than said receptacle removably fitted therein and having means to secure it in an upright position in the receptacle, and a perforated spreader plate for said thimble.

MRS. GRACE GERMAN CHAMBERLAIN.